United States Patent
Ulybin

(10) Patent No.: US 7,733,848 B2
(45) Date of Patent: Jun. 8, 2010

(54) SIGNAL-TYPE DEPENDENT REAL-TIME FAX RELAY

(75) Inventor: Vladimir Ulybin, Rishon Lezion (IL)

(73) Assignee: AudioCodes Ltd., Lod (IL)

( * ) Notice: Subject to any disclaimer, the term of this patent is extended or adjusted under 35 U.S.C. 154(b) by 1414 days.

(21) Appl. No.: 11/136,933

(22) Filed: May 25, 2005

(65) Prior Publication Data

US 2006/0268831 A1 Nov. 30, 2006

(51) Int. Cl.
H04L 12/66 (2006.01)
G06F 15/00 (2006.01)
H04M 11/00 (2006.01)
H04N 1/00 (2006.01)
H04N 1/32 (2006.01)

(52) U.S. Cl. .................. 370/352; 370/356; 370/395.52; 370/401; 358/1.15; 358/425; 358/434; 358/442; 379/100.01; 379/100.09; 379/100.17

(58) Field of Classification Search .................. 370/352, 370/356, 395.52, 401; 358/1.15, 425, 434, 358/442; 379/100.01, 100.09, 100.17

See application file for complete search history.

(56) References Cited

U.S. PATENT DOCUMENTS

| | | | | |
|---|---|---|---|---|
| 6,385,195 | B2 * | 5/2002 | Sicher et al. ................. | 370/356 |
| 6,480,585 | B1 * | 11/2002 | Johnston ................ | 379/100.17 |
| 6,483,600 | B1 * | 11/2002 | Schuster et al. ............ | 358/1.15 |
| 6,728,308 | B1 * | 4/2004 | Chu et al. .................... | 375/222 |
| 6,836,538 | B1 * | 12/2004 | Johnston ................ | 379/100.17 |
| 6,868,146 | B2 * | 3/2005 | Kang ...................... | 379/100.06 |
| 6,985,477 | B2 * | 1/2006 | Couture ....................... | 370/352 |
| 7,057,755 | B2 * | 6/2006 | Yoshida ..................... | 358/1.15 |
| 7,068,668 | B2 * | 6/2006 | Feuer .......................... | 370/401 |
| 7,085,021 | B1 * | 8/2006 | Vivarelli ..................... | 358/435 |
| 7,193,739 | B2 * | 3/2007 | Mundra et al. ............. | 358/1.15 |
| 7,301,933 | B1 * | 11/2007 | Baggs et al. ................ | 370/352 |
| 2002/0128825 | A1 * | 9/2002 | Sugino ....................... | 704/208 |

(Continued)

OTHER PUBLICATIONS

"Series T: Terminals for Telematic Services—Procedures for Real-Time Group 3 Facsimile Communication over IP Networks—ITU-T Recommendation T.38"; Author: ITU-T Telecommunication Standardization Sector of ITU; Date: Sep. 13, 2005.

(Continued)

*Primary Examiner*—Alpus H Hsu
(74) *Attorney, Agent, or Firm*—Eitan Mehulal Law Group

(57) ABSTRACT

In order to enable V.34 fax relay communications over IP ("FoIP") without increasing a gateway complexity, the gateway relays all types of fax control signals in demodulated form and transfers fax image type signals either as demodulated or as PCM encoded signal, based on a predetermined condition. The PCM data type is added to FoIP protocol to allow transferring PCM encoded fax image signals without exiting from FoIP mode of operation until the completion of a fax call. During a FoIP call, the communicating gateway determines whether the input fax signal is a 'fax control signal' or a 'fax image' type signal. If the gateway determines that the input signal is a fax control signal or supported fax image signal, it handles it in a traditional fax relay manner. However, if the gateway determines that the input fax image type signal cannot be demodulated, it outputs the fax signal to the IP network as PCM encoded signal and without performing demodulation.

21 Claims, 3 Drawing Sheets

U.S. PATENT DOCUMENTS

2004/0184110 A1* 9/2004 Maei et al. ............. 358/400
2006/0067301 A1* 3/2006 Fruth et al. ............. 370/352

OTHER PUBLICATIONS

"JT-T30 Procedures for Document Facsimile Transmission in a General Switched Telephone Network", pp. 1-4; Author: The Telecommunication Technology Committee (TTC); Printed from the Internet on Dec. 4, 2005; Available on the Internet at: <www.ttc.or.jp/j/document_list/sum/sumE_JT-T30v14.pdf>.

"T.38 and the Future of Fax: the Emerging Standard for Real-Time Fax over IP Networks", Intel White Papers—Intel Telecom Resources; Author: Intel Corporation; Date: Apr. 30, 1999; Printed from the Internet on Dec. 4, 2005 from: <www.intel.com/network/csp/resources/white_papers/4631web.htm>.

"RFC 3362, Real-time Facsimile (T.38)-image/t38—MIME subtype Registration"; Author: G. Parsons, Nortel Networks; Date: Aug. 1, 2002; Printed from the Internet on Dec. 4, 2005; Available on the Internet at: <http://www.faqs.org/rfcs/rfc3362.html>.

"Commercial Telecommunications Standards—V-Series ITU Recommendations—Data Communications over the Telephone Network-V.100-399—Interwoking With Other Networks", pp. 1-5; Author: Defense Information Systems Agency (DISA); Date: Sep. 19, 2005; Printed from the Internet <http://comm.disa.mil/itu/r_v100.html> on Dec. 4, 2005.

"Tiresias Guidelines—Telecommunications"; Author: Royal National Institute for the Blind (RNIB)—Digital Accessibility Team (DAT); Date: Dec. 4, 2005; Available online at: <www.tiresias.org/guidelines/telecoms.htm>.

"ITU-T Recommendation T.30—Series T: Terminals for Telematic Services—Procedures for Document Facsimile Transmission in the General Switched Telephone Network"; Author: ITU-T—Telecommunication Standardization Sector of International Telecommunication Union (ITU); Date: Jul. 14, 2003.

"ITU-T Recommendation T.38—Series T: Terminals for Telematic Services—Procedures for Real-Time Group 3 Facsimile Communication Over IP Networks"; Author: ITU-T—Telecommunication Standardization Sector of International Telecommunication Union (ITU); Date: Apr. 1, 2004.

"ITU-T Recommendation V.152—Series V: Data Communication Over the Telephone Network—Interworking With Other Networks—Procedures for Supporting Voice-Band Data Over IP Networks"; Author: ITU-T—Telecommunication Standardization Sector of International Telecommunication Union (ITU); Date: Jan. 1, 2005.

"ITU-T Recommendation V.34—Series V: Data Communication Over the Telephone Network—Interfaces and Voiceband Modems—A Modem Operating at Data Signaling Rates of up to 33600 Bit/s for use on the General Switched Telephone Network and on Leased Point-To-Point 2-Wire Telephone-Type Circuits"; Author: ITU-T—Telecommunication Standardization Sector of International Telecommunication Union (ITU); Date: Feb. 6, 1998.

"ITU-T Recommendation V.150.1—Series V: Data Communication Over the Telephone Network—Interworking With Other Networks—Modem-Over-IP Networks: Procedures for the End-to-End Connection of V-Series DCEs"; Author: ITU-T—Telecommunication Standardization Sector of International Telecommunication Union (ITU); Date: Jan. 1, 2003.

* cited by examiner

SIGNAL-TYPE DEPENDENT REAL-TIME FAX RELAY

FIELD OF THE INVENTION

The present invention relates generally to the field of facsimile communications. More specifically, the present invention relates to the field of real-time fax relay generally called fax over IP ("FoIP") communications, and even more specifically, to a signal type dependent real-time fax relay used in connection with FoIP systems.

BACKGROUND

The development of the Internet and other similar distributed data communication networks (i.e., Internet Protocol ("IP") based networks, or, simply, 'IP networks') has facilitated a growth in the number of people using IP-based networks to exchange various types of information, such as voice, fax and modem calls. The key method supporting fax calls over packet networks is the fax over IP ("FoIP").

Fax relay is considered a reliable method for carrying out 'end-to-end' fax communications over IP networks. The communication protocol of FoIP systems is described in ITU-T Recommendation T.38 ("Procedures for real-time Group 3 facsimile communication over IP networks") Roughly, ITU-T T.38 is a set of rules defining the FoIP call establishment and the packet format for transferring different signals of regular G3 and V 34 half-duplex ("HDX") fax calls. The other fax relay protocol is defined in the Voice over Frame Relay Implementation Agreement FRF 11 but it has a limited use in comparison to T.38.

Traditionally, fax machines were, and still are, designed to make fax calls via a public switched telephone network ("PSTN"). The way in which such fax calls are managed and the way they traverse the PSTN infrastructure is defined in the ITU-T Recommendation T.30 ("Procedures for document facsimile transmission in general switched telephone networks"). Briefly, fax machines employ modulation schemes for allowing such traversals. However, for enabling FoIP calls, the signal output by a fax machine must be translated into a bit stream suitable for transmission via an IP network. The translation is performed by a corresponding media gateway (hereinafter "gateway") that is connected on one hand to the fax terminal or PSTN, and, on the other hand, to the IP network. Such media gateways typically include a 'fax relay', speech coder and voice band data ("VDB") paths for enabling fax calls, verbal and modem communication, respectively, as schematically shown in FIG. 1.

Traditionally, voice-over-IP ('VoIP') gateways process input and output voice band signals at 8 kHz sampling rate. Gateways exchange the signals with analog devices via interface circuits. Higher sampling rates are allowed as well However, for pulse code modulation ("PCM") based transfer over IP, which is based on bit rates up to 64 kbps (kilo-bits-per-second), the signals should be sampled at a rate of 8 kHz. Typically, the input samples represent a sine waveform (carrier) signal modulated by a digital bit stream according to a standard modulation scheme. The modulating bit stream may contain some useful information such as fax capabilities, commands, responses, image bit map, transferred binary file, mixed raster content, etc A purpose of fax gateways is to deliver all or most of the signals end-to-end between two communicating fax machines by a way that the faxes are able to complete a fax call/session without error alarms and such that an answering fax machine may receive analog signals from a gateway and extract a binary information transferred to it by the 'In-Message' procedure, and interpret it as intended by the originating fax.

Typically, fax relay gateways detect, demodulate and re-modulate all types of fax signals from the beginning till the end of a fax call. Usually, if the gateway is unable to relay at least some fax signals then it employs the VBD method to transfer a complete call over IP. It is noted that by using the wording 'VBD method' and 'fax relay' it is also meant to include the use of corresponding software tools, hardware, algorithms and applications as required for operating these circuitries.

By 'VBD' is meant method according to which modem's signals are transported over IP networks using a codec that passes voice band data modulated signals with minimum distortion. Exemplary VBD codecs are the G.711 A-law and G 711 µ-law codecs, which are commonly utilized by ITU-T V.150.1 ("Procedures for the end-to-end connection of V-series DCEs over an IP network") and ITU-T V.152 ("Procedures for supporting Voice-Band Data over IP Networks") standards PCM encoders of the G.711 type output bit streams at the rate 64 kbps, whereas PCM encoders of the G.726 type output bit streams at a rate of up to 40 kbps.

Typical FoIP media gateways, readily available on the market, were primarily designed to cope with (regular) group 3 ("G3") fax machines, which are capable of producing HDX fax image data streams at a bit-rate less than or equal to 144 kbps, and exchanging HDX fax's control signals at a rate of 300 bps. After being received by a gateway, these signals are handled by the fax relay. The fax signal translation performed in the gateway involves demodulation of the incoming sampled signal by a fax relay receiver, packetization of the demodulated data according to a fax relay protocol ('FRP'), and transmittal of the FRP packets to the IP network. A receiving gateway includes a fax relay transmitter, the task of which is to re-modulate the FRP packets, received from the packet network, according to modulation schemes that are defined for G3-type faxes in the ITU-T Recommendation T.30

Currently, there exist V 34-type fax machines that are known to those skilled in the art also as "super-G3" fax machines, which have a signal flow and modulation schemes that are more advanced in comparison to those of regular G3 fax machines. For example, a super-G3 fax machine transfers HDX fax images at a bit-rate as high as 336 kbps (vs 14.4 kbps in G3 fax machines) and exchange different types of fax control signals full duplex at bit-rates of 300, 600 and 1200 (2400) bps. Full support of V.34 fax relay as defined by T.38 Rec. is highly problematic due to considerable computational resources that are required, on the receiving/transmitting gateway side, for processing V.34 fax images and training equalizer signals.

Traditional gateways avoid the latter obstacle by using the relatively low-complex VBD method. They do so by switching to VBD 'mode of operation', handling and transferring (i.e., over the IP network) the incoming V.34 type signals as if they were voice band modem signals; i.e., without demodulation. However, as far as operating under real IP network conditions, the latter solution is very problematic shorthand and unsatisfying; that is, IP networks have variable packet latency, multi-node packet processing and bandwidth restrictions. More specifically, the problems associated with the latter solution are the following:

i) Data streams exchanged by gateways are required to be full duplex at bit-rates of 64 kbps in order to allow communications at fax rates above 7.2 kbps;

ii) The 'VBD path' (i.e., in a gateway) is highly sensitive to residual echoes and imperfection of echo canceling process, which tend to cause 'fallbacks' in bit-rates, inaccurate reconstruction of the original fax images, and fax calls failures;

iii) The traditional solution involving usage of VBD is sensitive to packet latency. Long constant delays of packets in the IP network may cause signal collisions at the destination fax machine, and failure or abortion of fax sessions;

iv) The 'VBD path' is highly sensitive to packet jitter (variable delay) in the network. An attempt to extend the input queue buffers for solving this problem would result in large constant delays, possible collisions of fax signals, and 'timeout' related disconnections, and v) The 'VBD path' solution is highly sensitive to packet loss.

Therefore, as far as super-G3 fax terminal equipments are concerned, traditional gateways provide a solution that is far from being adequate.

SUMMARY OF THE INVENTION

In general, the present invention is characterized by not utilizing the commonly known VBD method for delivering fax calls but, rather, by employing a novel type of 'fax relay' for all available types of fax signals (i.e., control and image relating signals) because a fax relay is more reliable in comparison to the VBD method.

As part of the present invention, a method of delivering fax calls between gateways over an IP network is provided, according to which a distinction is made between two types of fax signals, the first type being generally associated with 'fax control signals', and the second being generally associated with 'fax image signals', wherein gateways relay all types of fax control signals in demodulated form and conditionally transfer fax image type signals either as a demodulated signal or as a PCM encoded signal, based on a predetermined condition.

In some embodiments of the present invention, the predetermined condition of relaying fax image signals in demodulated form may relate, e.g., to the availability of computational resources in the gateway required for performing the demodulation process, and/or to whether the gateways involved both support the modulation scheme used by the fax machines. Of course, other considerations may be taken into account, whether cumulatively or uniquely, when employing the predefined demodulation condition.

More specifically, if the gateway does not support a modulation scheme that is currently utilized by a fax machine, or the gateway does not have enough computational resources for performing demodulation, then the gateway may forward the signal in question to the IP network essentially 'as is', by using minimum-distortion PCM encoder without departing from the fax relay mode of operation. In turn, when the gateway receives an FRP stream containing PCM-type data from the IP network, it must be able (in addition to its 'conventional re-modulation' capability) to decode PCM-type data and transmit the output signal to a connected fax machine in conformity to T.30 requirements.

As part of the present invention, a method is disclosed for processing in real-time an outgoing fax over IP ("FoIP") signal by a gateway, comprising:

a) Receiving an incoming fax signal and, based on its signal characteristics, associating it either with a first type of signals (e.g., if it is a fax control signal) or with a second type of signals (i.e., if it is a fax image signal), b) Demodulating the fax signal if it is associated with the first type of signals (and, therefore must be de-modulated) or if it is associated with the second type of signals and it is decided that it is within the gateway's capacity to demodulate the fax signal; and outputting the resultant FRP packetized data to the IP network; otherwise, c) PCM-encoding the fax signal and outputting the resultant FRP-PCM packetized data to the IP network.

In some embodiments of the present invention, an incoming fax signal is associated with the first type of signals and relayed (unconditionally) if it belongs to the group signals consisting of {Answer fax tone including V.8 modified answer tone; V.21 (FSK, 300 bps), V.34 INFO (DPSK, 600 bps); V.34 Control Channel (QAM, 1200 bps or 2400 bps)} Calling fax signals that precede an answer tone (e.g., CNG and V 8 CI signals) may be conveniently transferred in the form of compressed voice signals or in a form of fax events that are relayed using VoIP or FoIP technique.

In some embodiments of the present invention, an incoming fax signal belonging to the group consisting of {V.27 (Phases B and C); V.29 (Phases B and C), V 17/V 33 (Phases B and C); V 34 Line probe (Phase B); V.34 Primary channel equalizer training (Phase B); V 34 Primary channel (Phase C)}, is associated with the second type of signals and is demodulated if there are enough computational resources for demodulation, otherwise it is PCM-encoded before being forwarded to the packet network As part of the present invention a method is disclosed for processing in real-time a fax over IP ("FoIP") signal received by a gateway, comprising:

a) Determining whether the received fax signal is FRP-type data or FRP-PCM type data (i.e., depending on the type of signal that was originally transmitted to the gateway by a remote gateway;

b) Re-modulating the incoming fax signal if it is determined to be FRP-type data, and forwarding the resultant signal (in the form of samples) to an intended recipient (normally a fax machine); or c) PCM-decoding the incoming fax signal if it is determined to be FRP-PCM type data, and forwarding the resultant signal (in the form of samples) to the intended recipient.

As part of the present invention, the determination how to process (i.e., performing demodulation or PCM-encoding) the incoming fax signal may be made by judging, such as by a 'state machine', a currently, and historically based on previously detected or demodulated fax signals and received FRP data from the IP network. The judging may also be based on the gateway capabilities and on the estimation of resources available for performing demodulation.

The present invention also discloses a 'fax relay state machine' for allowing FoIP communication between gateways delivering fax calls over an IP network The fax relay state-machine is operable to:

a) Be configured with a set of rules associated with the potential employment of any available fax modulation schemes, and by a temporary set of rules intended for supporting fax modulation schemes that may be potentially used in a current fax call while taking into account available computational resources;

b) Evaluate current and historic input fax signals based on the fax and FRP data responses returned from a remote gateway;

c) Judge, based on the evaluation, whether the input fax signal can be demodulated and, if the input digital signal can be demodulated, then to invoke a corresponding fax receiver and to forward the resultant FRP data to the IP network;

d) Invoke PCM encoding and to forward the resultant FRP-PCM type data to the IP network without performing any demodulation;

e) Buffer the FRP-type data stream arriving from the IP network, and to f) Invoke a fax transmitter or a PCM-decoder in a way that the output fax signals would conform to the ITU-T T 30 Recommendation In one aspect, the fax relay resides within the gateway. In another aspect, the fax relay is external to the gateway and in communication with it.

As part of the present invention, a gateway is also disclosed, which includes the novel fax relay.

In some preferred embodiments of the present invention, the gateway further includes also a speech coder and a VBD path.

BRIEF DESCRIPTION OF THE DRAWINGS

The subject matter regarded as the invention is particularly pointed out and distinctly claimed in the concluding portion of the specification The invention, however, both as to organization and method of operation, together with objects, features, and advantages thereof, may best be understood by reference to the following detailed description when read with the accompanying drawings in which:

Figure 1:
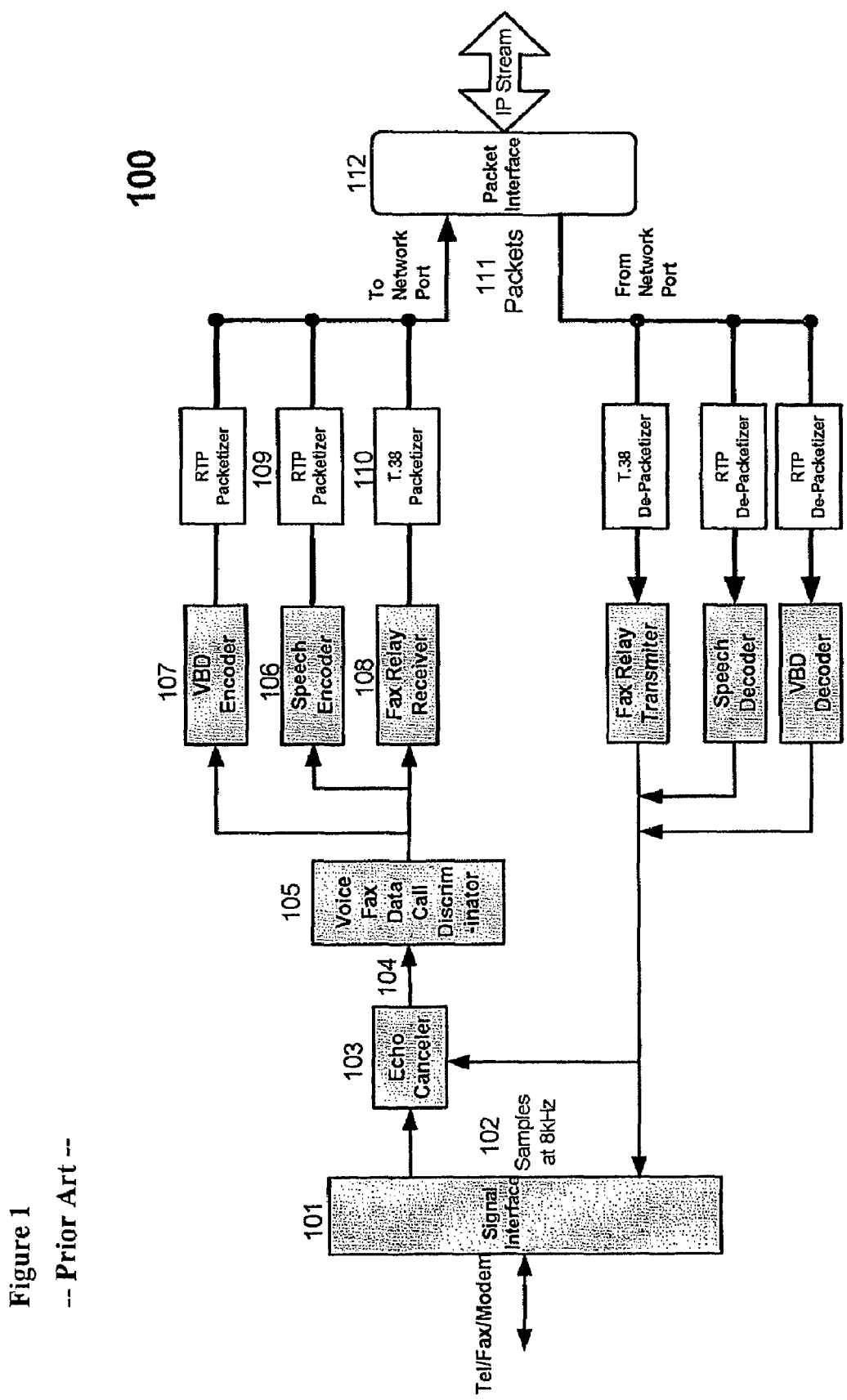
FIG. 1 (prior art) is a block diagram showing an exemplary conventional gateway used for delivering fax calls over an IP network.

By 'originate' or 'answer' mode is meant herein to the mode of operation of a fax relay unit when operating at the side of a facsimile terminal that sends or receives fax image signals to, or from, a connected facsimile terminal, respectively.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

In particular, the method disclosed in the present invention is not limited to a specific type of a packet (or IP) network, communication protocol or standard for relaying demodulated fax data.

In the following description, packets encoded according to a Fax Relay Protocol ("FRP"), such as T 38 and FRF.11, are herein referred to as "FRP" packets. In addition, the present invention is not intended to be limited to a specific facsimile's modulation scheme described in the of ITU-T T.30 Recommendation. For example, the method disclosed herein may be used for relaying also non-standard fax calls.

As known in the art of telecommunications, in cases where voice transmissions are involved, the original voice signal is first digitized by an external analog to digital ("A/D") converter (i.e., CODEC). A typical CODEC samples the analog Tel/Fax/Modem signal at sampling rate 8 kHz and outputs the digitized signal as series of linear 16-bit samples or 8-bit compressed PCM A-law or µ-law bytes The term 'fax over IP' (FoIP) refers generally to facsimile communication over IP network by using the fax relay protocol defined in "ITU-T Recommendation T.38". However, it is noted that the present invention can be applied, mutatis mutandis, essentially to any other fax relay protocol/standard and other packet networks.

As described hereinbefore, an input fax signal may belong either to a first or to a second type of signals In general, the first type of signals (i.e, fax control signals) may include, inter alia, T 30 Phase A type Tone signals, V.21-modulation based signals and V.34 'INFO' and V 34 'Control Channel' signals Signals belonging to the first group are characterized by being relatively 'simple' signals, that is, they are simple in the sense that their processing does not require much computational resources, and therefore, in accordance with the principles of the present invention, signals belonging to the first type are conventionally relayed by gateways over IP network; that is, the gateways detect them, demodulate and forward the resultant fax-relay-protocol (FRP) data to the IP network. Upon receipt of the FRP data, the gateways generate or re-modulate corresponding fax signals and forward them to intended recipient (normally a fax machine).

The second type of signals (i.e, 'fax image signals') may include, inter alia, signals relating to the fax 'In-Message' procedure itself (i.e., T.30 Phase C signals), and to T.30 Phase B type 'pre-message' signals such as 'training check frame' ("TCF"), V.34 'line probe' signals and V.34 'Primary Channel' equalizer training ("TRN") signals.

Signals belonging to the second type of signals may be conditionally relayed in demodulated form or are said to be 'transparently' transferred over IP between gateways by using PCM encoding, FRP format, and PCM decoding.

A determination as to how and when to process (i e, performing demodulation or PCM-encoding) the incoming fax signal may be made by judging, such as by a 'state machine', a currently, and historically based on previously detected or demodulated fax signals and received FRP data from the IP network. The judging may also be based on the gateway capabilities and on the estimation of resources available for performing demodulation.

Some judgment is traditionally performed by various types of gateways for anticipating a current step in a specific fax communication/session. This judgment is essential because a gateway must 'know' in advance what the current step in a specific fax communication is going to be, in order to allow it to timely 'prepare' itself for a currently incoming signal; that is, by enabling circuitries relevant to the current signal and disabling, or muting other irrelevant circuitries, and by employing corresponding signal processing within the gateway. However, according to the present invention, the results of the judgment are somewhat different than the traditional one, as disclosed herein.

For correct functioning of the signal-type dependent fax relay being disclosed in the present invention, the PCM-based, and possibly some other modulation type(s), would be added into FoIP protocol proprietarily by a gateway's vendor or officially via ITU-T or by any other suitable forum.

At the stage of a FoIP call setup, the gateway compliant with the principles disclosed by the present invention negotiates the 'FRP-PCM capability' with the other FoIP capabilities The FRP-PCM mode of operation must be disabled if it is not confirmed by a remote gateway. In the latter case, the fax calls, for example V.34 fax calls, that cannot be relayed by the gateway may be transferred using a regular VBD mode of operation.

The invention considers the PCM scheme used during fax relay sessions as an integral part of FoIP protocol together with the other modulation schemes of fax signals. The PCM-based transfer of fax image signals (i.e., signals relating to the second type of fax signals) differs from VBD transfer, the differences therebetween being the following.

PCM stream is packetized in primary IP fax packets according to FRP (FoIP) rules but not according to RTP rules applied to VBD and compressed voice streams, while an upper level packetizing of primary fax packets may include RTP and other IP formats as well. For example, T.38 may be encapsulated in RTP;

2) Occasionally, a gateway may decide to switch from PCM mode of operation into demodulation mode of operation, and vice versa, to accommodate to actual signal type that depends on the current stage in a fax session/call being currently handled;

3) A gateway stays in FoIP mode of operation throughout the entire fax call; namely, no transitions take place between the "Audio", "VBD" and "FoIP" states/modes of operation during a given fax call. Therefore, PCM-type data streams are substantially insensitive to disrupts (i e, they are not distorted) and to temporally misplaced silence 'gaps' that may occur during transitions/switching between the states;

4) gateway transferring a FRP-PCM type data stream may, at the same time, process the fax control signals (i.e., signals belonging to the first type of signals) relayed by using FoIP method.

Turning now to FIG. 1, the gateway 100 may receive, at times, Telephone, Fax or Modem ('Tel/Fax/Modem') analog signals sampled at 8 kHz from serial port interface, or TDM port, 101. If in compressed form, the input samples are expanded by the gateway into linear 16-bit samples (102). Synchronously with receiving input samples, the gateway 100 transmits output samples to the serial or TDM port 101. If required, the output samples are compressed by gateway 100 before being transmitted.

The output samples transmitted to the analog signal interface 101 are utilized by echo canceller 103 as a reference to filter the incoming signal, whereby to obtain echoless signal 104. The voice/fax/data call discriminator 105 constantly monitors the echo-free input signal 104. If discriminator 105 detects a voice signal, the incoming samples are forwarded to speech encoder 106. If it detects a fax signal, the samples are forwarded to fax relay 108 for demodulation. In case of a modem signal being detected by discriminator 105, the input samples are forwarded to VBD encoder 107. As described hereinbefore in connection with traditional operation of gateways, if the input signal 102 originates from a super-G3 (i.e., V.34) fax machine, the gateway 100 routes the samples via VDB path 107 as if they were originated by a modem call. The consequences resulting from this solution were discussed hereinabove.

Depending on the path of signal processing, gateway 100 packetizes the output bit-streams according to the real-time transport protocol RTP (109) or fax relay protocol T.38 (110), and transfers the packets (111) to the network packet interface (112), which forwards it, possibly after some modifications, to the IP network (not shown) The bit-stream passing through interface 112 may relate, at times, either to the compressed voice or to PCM encoded modem or to the demodulated fax signals.

No further description will be given hereinafter in respect of the blocks shown in FIG. 1, because their functionality is well known to those skilled in the field of voice over IP technologies.

Figure 2:
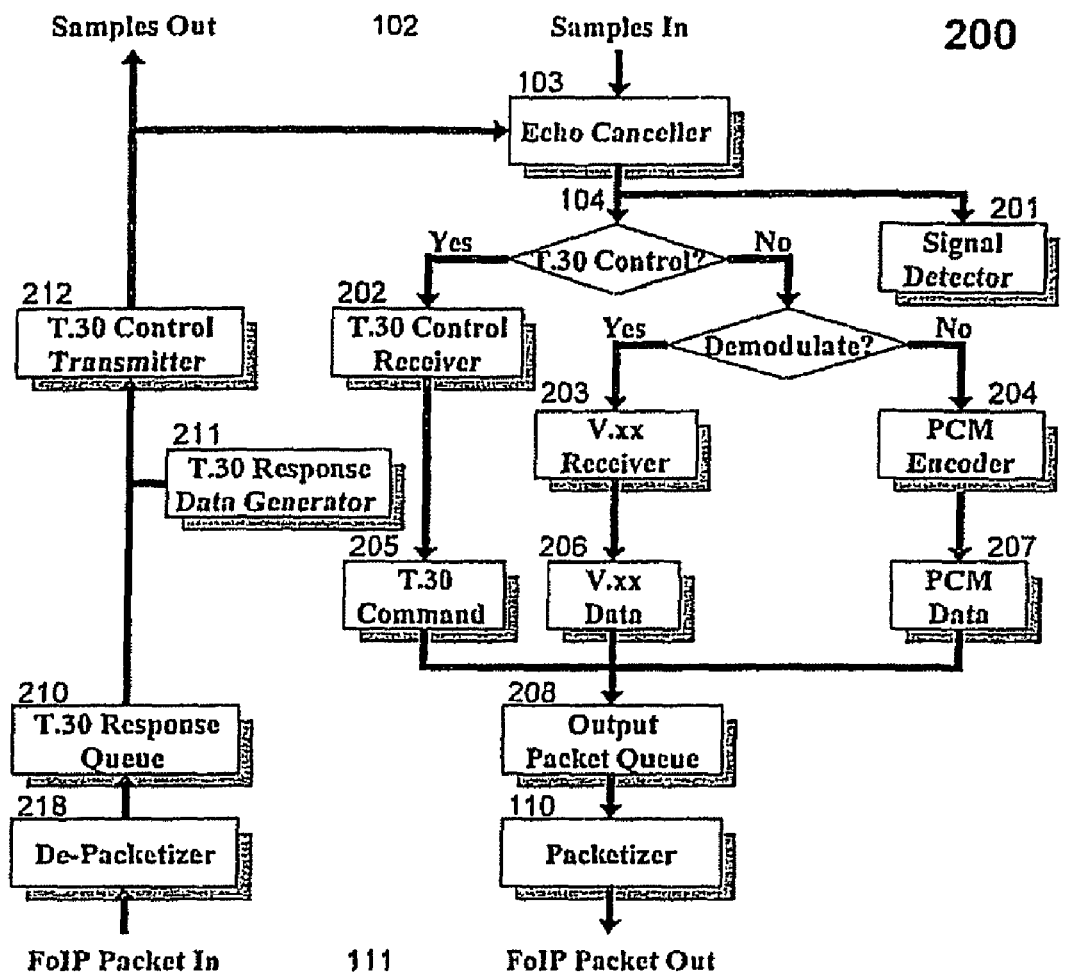
FIG. 2 is a block diagram showing signals flow in an exemplary fax relay while in 'originate' mode of operation according to some preferred embodiments of the present invention.
Figure 3:
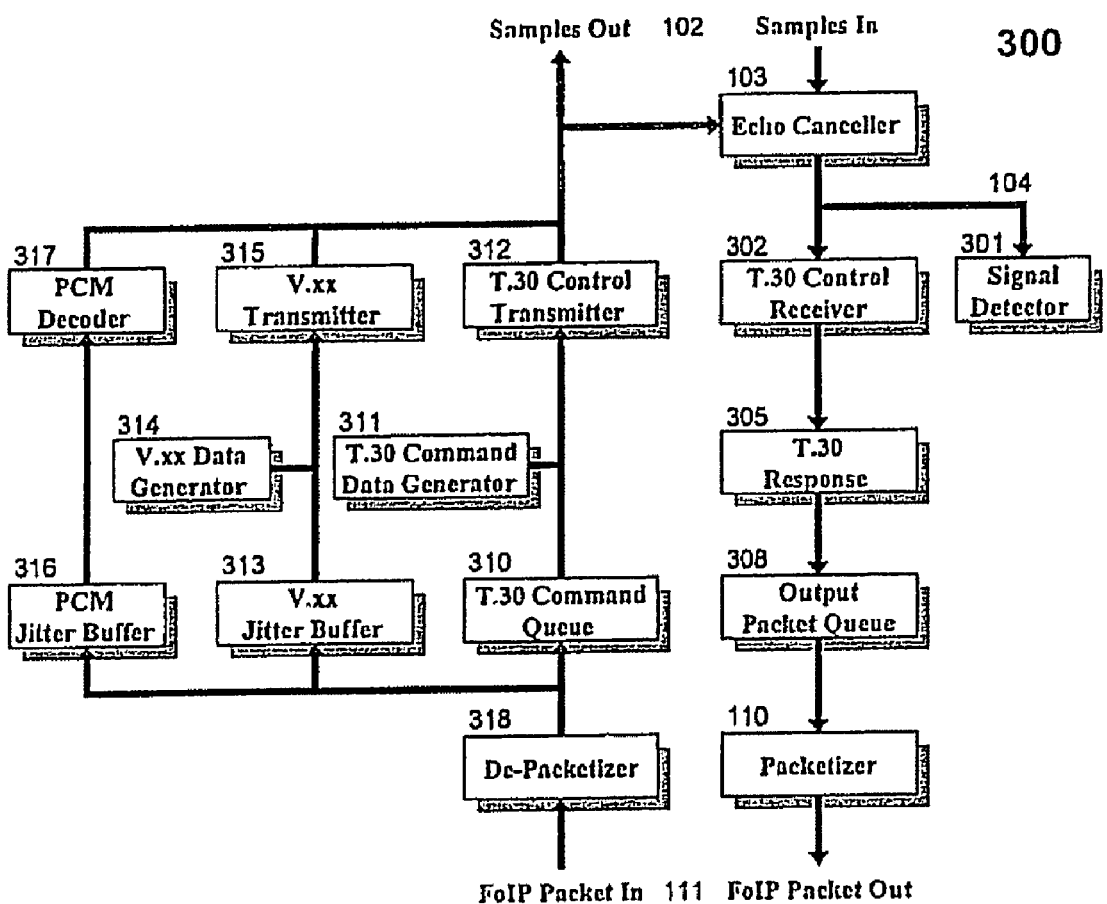
FIG. 3 is a block diagram showing signals flow in an exemplary fax relay while in 'answer' mode of operation according to some preferred embodiments of the present invention.

Turning to FIG. 2 and FIG. 3, they show block diagrams of a fax relay handling an originating (200) and answer (300) fax call, respectively, in accordance with the present invention. In respect of fax control signals, gateways 200 and 300 perform a similar bi-directional communications processing. Namely, each of the gateways 200 and 300 may both receive and transmit fax control signals from/to a connected fax machine. In respect of fax image signals propagating only in one direction, gateway 200 only receives this type of signals from an originating fax machine, while gateway 300 only transmits fax image signals to an answering fax machine Fax relay gateway 200/300 receives the sampled input fax signal 102, filtered by the echo canceller 103. The fax relay state machine of gateways 200/300 (not shown) determines how the input signal should be processed. In one aspect, the latter determination is made according to the input signal analysis performed by signal detector 201/301, which monitors the echo-free input samples 104. In another aspect, the determination is based on monitoring fax packets received from the IP network. As part of the analysis process, the state machine considers the history of previous signal sequences that were received from and transmitted to a connected fax machine. The decision about the type of a currently received, or handled, signal (i.e., fax control or fax image) is made per every signal. The decision as to how to process fax image signals is taken by the state machine one time per fax call, and depending on the type of the fax call (i.e., regular G3 or V.34 fax call), and on the amount of computational resources required (and available) for processing a current call.

If the state machine determines that signal 104 relates to T.30 Control type signals, it causes signal 104 to be routed to the 'T.30 Control path', where signal 104 is first processed by T.30 Control receiver 202/302.

Receivers 202 and 302 are advantageously designed for demodulating fax control signals According to the T.30 standard dated 07/2003, such fax control signals are the following. V 21 (frequency shift keying—FSK, 300 bps), V.34 INFO (differential phase shift keying—DPSK, 600 bps) and V.34 Control Channel (quadrature amplitude modulation—QAM, 1200 bps or 2400 bps). Receiver 202/302 operates in a frequency spectrum that similar to the frequency spectrum of the received signals (104). In this context, receiver 202/302 operates in a conventional manner. Namely, receiver 202/302 demodulates fax signal 104 to extract therefrom information/messages, in binary format. Thereafter, the fax relay state machine forwards the extracted binary data through T.30 command/response analyzer 205/305 and outputs packet queue 208/308 to packetizer 110, which packetizes the binary data and forwards the resulting FoIP packets 111 (FIGS. 1, 2 and 3) to the packet interface 112 (FIG. 1)

However, if the state machine of gateway 200 determines that signal 104 does not relate to fax control type signals, a second decision is reached, as to whether signal 104 has to be demodulated according to a different demodulation scheme, or it has to be PCM encoded. The latter decision depends on the signal type, as detailed hereinafter.

The 'V xx' receiver (203) is advantageously designed for demodulation of signals such as V.27 (DPSK, 2.4/4.8 kbps), V.29 (QAM, 7.2/9.6 kbps) and V.17/V.33 (Trellis code modulation—TCM, 7.2/9.6/12.0/14.4 kbps) used in G3 fax calls for T.30 training check TCF and images. Depending on a gateway configuration and available resources for performing demodulation, receiver 203 is either enabled or disabled. When invoked by the fax relay state machine, the receiver 203 extracts the TCF or fax image data (206), and forwards it through packet queue 208 to FoIP packetizer (110), which packetizes the extracted data and forwards the resulting packets 111 (FIGS. 1 and 2) to the packet interface 112 (FIG. 1)

The PCM encoder (204) performs G.711 A-law, or µ-law, type compression of signals that the state machine determined that they should be transferred 'transparently' Theoretically, the state machine may decide to disable, or mute, V.xx demodulation activities related to any one of the modulation standards V.27, V 29, V.17 and V.33, in which case the disabled Phase C fax image and preceding Phase B TCF signals would be transferred using PCM mode of operation In case of V.34 fax calls, the following groups of signals are transferred as PCM encoded signals: Line probe (Phase B) signals, Primary channel equalizer training (Phase B) signals, and Primary channel (Phase C) signals. The fax relay 200 packetizes (110) the resulting PCM data by utilizing rules that are dictated by the FoIP protocol According to current T38 Recommendation, the V.34 INFO and line probe and V.34 equalizer training signals are not relayed but, instead, they are locally generated in/by the gateway. Also the T.30 TCF signal may be locally generated by the gateway According to the present invention, V.34 INFO signals are relayed after being demodulated, and V.34 line probe, V.34 equalizer training and optionally T.30 TCF signals are transferred by means of PCM. This is essential for effective adaptation of the fax rate involved to the current line conditions and for successful reception of post-coming Phase C image signals by an answering fax machine.

The present invention makes use of the T.38 protocol version 04/2004, which is extended for the purposes of the present invention using three T.30 INDICATORS and two T.30 DATA types The three T.30 INDICATORS are:
V.34 INFO;
PCM, G 711 µ-law; and
PCM, G.711 A-law.
The two T.30 DATA types are
INFO data; and
PCM data.

Synchronously with processing the input fax signals, the gateways 200 and 300 transmit the output signals to connected fax machines. By default, in the absence of fax packets from the IP network, the fax relay transmitter mutes its output The fax relay de-packetizer 218/318 receives the FoIP bit stream from the IP network ("FoIP Packet In"), recovers lost packets, re-orders packets arriving in incorrect sequence, and removes excess redundancy data. The resultant data is buffered according to its type (i.e., 210/310, 313 or 316). The fax relay state machine decides if, when and how to re-modulate or decode (as the case may be) the arriving data in a way to conform to the fax transmission protocol T 30.

Relayed fax control signals pass through the T.30 response/command queue 210/310 and are re-modulated by transmitter 212/312. The T.30 response/command signal/data generator 211/311 operates in conjunction with T.30 response/command queue 210/310 in order to locally generate T.30 signals/data for preventing the abortion of connections between respective fax terminal equipments in cases of incoming packets being delayed. The duration of transmitted fax control signals is adjusted to network delays by varying the length of tonal components and amount of HDLC flags or fill bits The fax image or TCF data relayed from an originating side passes through the V xx jitter buffer 313 and is re-modulated by V.xx transmitter 315. Though this is not necessarily so, V.xx transmitter 315 of the answering gateway usually re-modulates data by using a modulation standard and a data rate similar to those used by a remote gateway and the originating fax. The V.xx data generator 314 is utilized as a source of binary data for image related signals that can or should be locally generated by gateway 300. For example, such image related data may be local TCF, HDLC flags and T.4 fill bits.

When FRP-PCM type stream arrives from the IP network, the data stream is first buffered (316) and then PCM decoded (317) to produce the output signal.

It is noted that fax relays 200 (FIG. 2) and 300 (FIG. 3) actually refer to the same novel fax relay that is disclosed herein. FIGS. 2 and 3 schematically illustrate the 'originating' and 'answering' portions, sections or elements, of the fax relay, respectively, as explicitly described hereinbefore.

The method disclosed in the present invention is advantageous over the prior art in that it offers a compromise between two traditional methods, i.e., FoIP and VBD:

The method disclosed by the present invention is advantageous over VBD in terms of reliability and bandwidth utilization; and The gateway disclosed by the present invention has lower complexity vs. traditional FoIP gateways, because, according to the novel principles that are disclosed in the present invention, signal modulation standards that are dedicated by T.30 Recommendation for fax image transmission (V.27, V.29, V.17/V.33, and V 34) may be spared In comparison to VBD, the method and fax relay disclosed by the present invention are advantageous in other aspects. For example, transferring fax control signals enjoys the benefits of FoIP vs. VBD. More specifically, the method and fax relay disclosed by the present invention are characterized by:

Saving bandwidth for fax control signals and silence periods relayed at low bit-rates;

Having half-duplex PCM type data stream, thereby saving a communication bandwidth that would otherwise be required for backwards channeling, Being free of echoes: the novel gateway never returns echoes over IP to a remote gateway and connected fax and, therefore, it presents a much better signal-to-noise ratio, Being well protected from signal/data collisions because it transmits the fax signals according to T.30 signal flow definition;

Being well protected from packet loss for fax control signals;

Enabling fax spoofing for solving problems of signal delay caused by the IP network and/or by the fax machine involved in the fax communication;

Overcoming T 30 violations; and

Suppressing the influence of network jitters and clock synchronization errors by means of long enough buffering of PCM data stream that is received from the IP network.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed:

1. A method of delivering substantially in real-time a fax call from a gateway to an Internet Protocol (IP) network,
wherein the fax call comprises: (a) analog signals of fax negotiation and control belonging to a first type of fax signals, and (b) half-duplex analog signals modulated according to a modulation scheme selected by fax terminals for fax image transfer belonging to a second type of fax signals,
the method comprising:
distinguishing between the first type of signals which are received at the gateway and the second type of signals which are received at the gateway;
transferring signals belonging to said first type by said gateway to said IP network after being demodulated in said gateway, and
transferring signals of said second type by said gateway to said IP network either after being demodulated or after being Pulse Code Modulation (PCM) encoded based on a predetermined condition,
wherein the determining how to process the sampled input fax signal is performed on per-signal basis,
wherein the transferring signals belonging to said second type after either being demodulated or PCM encoded is selected on per-fax-call basis,
wherein, if PCM encoding is used in the delivering of a fax signal, then the method comprises autonomously initiating the PCM encoding by the gateway,
wherein the gateway is to autonomously switch, within a fax relay session, from or to utilizing a PCM-encoded signal stream, to or from, respectively, utilizing a demodulated data stream.

2. The method according to claim 1, wherein the first type of signals is generally associated with fax control signals, and wherein the second type of signals is generally associated with fax image signals.

3. The method according to claim 2, wherein the fax control signal comprises any signal belonging to a group of signals consisting of: Answer fax tone including V.8 modified answer tone; V.21 FSK, 300 bps; V.34 INFO DPSK, 600 bps; V.34 Control Channel QAM, 1200 bps or 2400 bps.

4. The method according to claim 2, wherein the fax image signal comprises any signal belonging to a group of signals consisting of: V.27 Phases B and C; V.29 Phases B and C; V.17/V.33 Phases B and C; V.34 Line probe Phase B; V.34 Primary channel equalizer training Phase B; V.34 Primary channel Phase C.

5. The method according to claim 1, comprising:
if the predetermined condition is met, relaying a signal of the second type by the gateway after demodulating said signal;
otherwise, transferring said signal after PCM encoding said signal.

6. The method according to claim 5, wherein the predetermined condition relates to at least one of:
availability of one or more computational resources in the gateway that are required for performing signal demodulation process, and
whether the gateway supports the modulation scheme selected by fax terminals for image transfer.

7. The method of claim 1, wherein, if the gateway is incapable of relaying V.34 or the modulation scheme fax image signals in demodulated form, then the method comprises:
avoiding to force a modulation scheme having a lower complexity;
avoiding utilization of a Voice-Band-Data (VBD) transfer method for fax calls;
relaying signals of the first type in demodulated form, and relaying signals of the second type in PCM encoded form.

8. The method of claim 1, wherein the method comprises: substantially avoiding backwards channeling during PCM relay.

9. The method of claim 1, wherein the gateway is able to PCM-encode analog fax signals of the second type, and wherein the gateway is able to relay signals of the second type in non-demodulated form.

10. The method of claim 1, wherein transferring signals of the second type comprises:
receiving a sampled input fax signal;
determining how to process the sampled input fax signal, based on: (a) monitoring the sampled input fax signal, (b) monitoring fax packets received from the IP network, and (c) analysis of history of previous signal sequences associated with at least one of an originating fax machine and a destination fax machine.

11. The method of claim 1, wherein, if a signal to be relayed comprises a signal selected from a group consisting of: a V.8 signal, a V.34 INFO signal, and a T.30 control signal, then the method comprises: demodulating the signal and then relaying the demodulated signal.

12. The method of claim 1, wherein, if a signal to be relayed comprises a signal selected from a group consisting of: a V.34 Line Probe signal, a V.34 primary channel equalizer Training Signal, a T.30 Training Check Frame signal, and a fax image signal, then the method comprises: PCM-encoding the signal and then relaying the PCM-encoded signal.

13. The method of claim 1, wherein the gateway is able to relay signals of the second type at a bit-rate ranging between 2.4 kilobit per second and 33.6 kilobit per second while avoiding confinement of relayed signals of the second type to a bit-rate sub-range of 2.4 kilobit per second and 14.4 kilobit per second.

14. The method of claim 1, wherein the method comprises: substantially avoiding PCM relay of silence gaps which are required according to T.30 Recommendation.

15. The method of claim 1, wherein the method comprises: substantially avoiding returning of an echo in PCM encoded signals relayed over IP to a remote gateway and to a remote connected fax terminal,
wherein transferring signals of the second type after being PCM encoded comprises transferring echo-free half-duplex PCM-encoded signals.

16. The method of claim 1, wherein the method comprises: protecting PCM relayed fax image type signals against network jitter by utilizing sufficiently-long buffering of PCM encoded signals in the gateway.

17. The method of claim 1, wherein the method comprises: protecting relayed signals from signal collision and from data collision, by performing at least: transmitting signals in accordance with T.30 signal flow definition.

18. The method of claim 1, wherein the method comprises: evaluating current input fax signals received from a local fax terminal and historic transmitted fax signals based on Fax Relay Protocol (FRP) data responses returned from a remote gateway;
based on the evaluation, determining whether the current input fax signals can be demodulated; and
if the current input fax signals can be demodulated, then invoking a corresponding fax receiver and forwarding resultant FRP data to the IP network.

19. The method of claim 1, wherein the method comprises: performing by the gateway modulation/demodulation of T.30 control signals, in a first direction from an originate fax terminate to an answer fax terminal, and also in a second, opposite, direction from the answer fax terminal to the originate fax terminal.

20. The method of claim 1, comprising:
receiving by the gateway non-demodulated PCM-encoded signals of the second type from the IP network in a format of Fax Relay Protocol; and
playing out by the gateway PCM-encoded signals of the second type toward a connected analog fax terminal.

21. The method of claim 20, wherein the playing out of PCM-encoded signals of the second type comprises:
Fax Relay Protocol (FRP) decoding and FRP recovery of lost PCM data packets and of re-ordered PCM data packets;
buffering of PCM data received from the IP network;
autonomously transitioning by the gateway, from or to modulation processing of a fax control signal relayed in demodulated form, to or from, respectively, PCM decode processing of a fax image type signal with transmission of silence gaps which are required according to T.30 Recommendation;
PCM decoding of buffered PCM data;
adjusting power of PCM decoded signals; and
sending the PCM decoded signal samples toward a connected analog fax terminal via a digital-to-analog signal interface.

* * * * *